United States Patent [19]
Inaba et al.

[11] Patent Number: 5,051,320
[45] Date of Patent: Sep. 24, 1991

[54] MAGNETIC RECORDING MEDIUM

[75] Inventors: Hiroo Inaba; Shinji Saito; Hiroshi Ogawa, all of Kanagawa, Japan

[73] Assignee: Fuji Photo Film Co., Ltd., Kanagawa, Japan

[21] Appl. No.: 309,580

[22] Filed: Feb. 13, 1989

[30] Foreign Application Priority Data

Feb. 12, 1988 [JP] Japan .................................. 63-30309

[51] Int. Cl.$^5$ .............................................. G11B 23/00
[52] U.S. Cl. .................................... 428/215; 428/329; 428/336; 428/408; 428/694; 428/900
[58] Field of Search ............... 428/408, 336, 694, 900, 428/215, 329; 427/131

[56] References Cited

U.S. PATENT DOCUMENTS

| 4,259,392 | 3/1981 | Suzuki | 428/900 |
| 4,511,617 | 4/1985 | Hideyama et al. | 428/900 |
| 4,546,038 | 10/1985 | Yamaguchi et al. | 428/900 |
| 4,624,883 | 11/1986 | Yamaguchi et al. | 428/900 |
| 4,643,941 | 2/1987 | Miyoshi et al. | 428/900 |
| 4,689,263 | 8/1987 | Kambe et al. | 428/900 |
| 4,851,289 | 7/1989 | Ogawa et al. | 428/900 |
| 4,865,924 | 9/1989 | Saito et al. | 428/900 |
| 4,946,740 | 8/1990 | Ono et al. | 427/131 |

Primary Examiner—Paul J. Thibodeau
Attorney, Agent, or Firm—Sughrue, Mion, Zinn, Macpeak & Seas

[57] ABSTRACT

A magnetic recording medium comprises a non-magnetic support having provided thereon a lower magnetic layer having a thickness of 2.5 μm or higher and an upper magnetic layer having a thickness of 2 μm or lower in this order, wherein both the upper and lower magnetic layers contain ferromagnetic particles, and the lower magnetic layer contains carbon black having an average primary particle diameter of less than 20 μm in the amount of from 1.0 to 20 parts by weight per 100 parts by weight of the ferromagnetic particles contained in the lower magnetic layer, and the upper magnetic layer contains carbon black having an average primary particle diameter of at least 40 μm but less than 80 μm in an amount of from 0.1 to 10.0 parts by weight per 100 parts by weight of the ferromagnetic particles contained in the upper magnetic layer, but less than the amount of carbon black used in the lower magnetic layer.

12 Claims, No Drawings

MAGNETIC RECORDING MEDIUM

FIELD OF THE INVENTION

This invention relates to a magnetic recording medium, and more particularly it relates to an improvement in a magnetic recording medium having at least two magnetic layers.

BACKGROUND OF THE INVENTION

Magnetic recording media comprising a non-magnetic support having provided thereon a magnetic layer containing ferromagnetic particles dispersed in a binder are generally used as audio tapes, video tapes and for computers. Audio tapes and video tapes are encased in a cassette.

Generally, a magnetic layer of such a magnetic recording medium contains carbon black for the purpose of charge prevention. The carbon black generally used has an average primary particle diameter of from 10 to 150 mμ. Generally, when carbon black having a small particle diameter is used in a magnetic layer, the surface of the magnetic layer becomes smooth, but the running properties and running durability deteriorate. On the other hand, when carbon black having a large particle diameter is used, the running properties and running durability are excellent, but surface smoothness is poor. Therefore, electromagnetic characteristics, particularly S/N in the case of a video tape, deteriorate.

In light of the above, it was attempted to add carbon black having various average particle diameters in combination into a magnetic layer of a single layer system, as disclosed in JP-B-54-9041, JP-B-53-20203, JP-B-57-12208 and JP-A-58-218039, but a magnetic recording medium having satisfactory both running durability and electromagnetic characteristics could not be obtained. (The term "JP-A" as used herein means an "unexamined published Japanese patent application" and the term "JP-B" as used herein means an "examined Japanese patent publication".)

A multiple layer system, wherein there are at least two magnetic layers, and a method of preparing a magnetic recording medium having both excellent running durability and electromagnetic characteristics is disclosed in JP-A-58-200425. Specifically, JP-A-58-200425 discloses a magnetic layer comprised, an upper layer and a lower layer, of two magnetic layers, wherein only the upper layer contains carbon black to improve running durability and heat resistance. The lower magnetic layer does not contain carbon black, and thus by increasing the packing density of magnetic particles in the lower magnetic layer, the electromagnetic characteristics are improved. However, in the above-described magnetic tape, fine carbon black, i.e. carbon black having an average primary particle diameter of 30 mμ, is contained only in the upper layer, and the absense of carbon black in the lower layer results in insufficient running durability. Also, the upper layer is made extremely thin layer, i.e., it is made to have a thickness of 1 μm or lower in order to improve the electromagnetic characteristics. However, when the magnetic layer is made so thin, the light-intercepting capability of the magnetic layer decreases. A decrease in light-intercepting capability can cause a VHS system to malfunction by prematurely indicating the end of a tape. This malfunction occure because in the video deck of the VHS system, the device which detects the end of the type is triggered at the point where the tape no longer intercepts light. In other words, when the light-intercepting capability of the magnetic layer is insufficient, the detecting device misinterprets a mid-point in the tape as the end of the tape, which by design has poor light-intercepting capabilities. It is the poor light-intercepting capability of the end of the tape which normally triggers the detecting device. Further, Japanese Patent Application No. 62-136364 (corresponding to U.S. Patent Application Serial No. 07/199,821 filed on May 27, 1988 by some of the coinventors of this invention with others) discloses a magnetic recording medium containing coarse carbon black having a particle diameter of 80 mμ or higher in the upper magnetic layer and containing fine carbon black having a particle diameter of less than 40 mμ in the lower magnetic layer. Since lower layer of this medium has fine carbon black, the surface smoothness thereof is excellent, and due to the smoothness of the lower layer, the upper layer also has comparatively good surface smoothness. Accordingly, Japanese Patent Application No. 62-136364 provides a magnetic recording medium with excellent electromagnetic characteristics and good running durability.

However, since the upper layer uses coarse carbon black, the dispersibility of carbon black in that layer is not always sufficient, and it is therefore not always possible to obtain both excellent electromagnetic characteristics and good durability. Also, due to the use of coarse carbon black in the upper layer, the light-intercepting capability of the magnetic recording medium tends to be poor, and thus the video decks in VHS systems tend to malfunction because the VHS system's detecting device misinterprets a mid-point in the tape as the tape's end.

Accordingly, a magnetic recording medium having (i) excellent electromagnetic characteristics, (ii) good running durability, and (iii) sufficient light-intercepting capability has not yet been obtained.

SUMMARY OF THE INVENTION

An object of this invention is to provide a magnetic recording medium having at least two magnetic layers and having excellent electromagnetic characteristics, good running durability and sufficient light-intercepting capability.

This invention relates to a magnetic recording medium comprising a non-magnetic support having provided thereon a lower magnetic layer having a thickness of 2.5 μm or higher and an upper magnetic layer having a thickness of 2.0 μm or lower in this order, wherein both the lower and upper magnetic layers contain ferromagnetic particles, and the lower magnetic layer contains carbon black having an average primary particle diameter of less than 20 mμ in an amount of from 1.0 to 20 parts by weight per 100 parts by weight of the ferromagnetic particles contained in the lower magnetic layer, and the upper magnetic layer contains carbon black having an average primary particle diameter of at least 40 mμ but less than 80 mμ in an amount of from 0.1 to 10.0 parts by weight per 100 parts by weight of the ferromagnetic particles contained in the upper magnetic layer, but less than the amount of carbon black used in the lower magnetic layer.

The average primary particle diameter of the carbon black employed in this invention is measured by the following manner.

A photo of carbon black is taken using a transmittance type electromicroscope (magnified 100,000 times). Then, the particle diameters of 500 carbon black particles taken in the photo are measured and the average value thereof is calculated.

The preferred embodiments of the above-described magnetic recording medium of this invention are as follows.

(1) The above-described magnetic recording medium, wherein the lower magnetic layer contains the above-described carbon black having an average primary particle diameter of less than 20 mμ in an amount of from 3 to 15 parts by weight per 100 parts by weight of the ferromagnetic particles in the lower magnetic layer.

(2) The above-described magnetic recording medium, wherein the upper magnetic layer contains the above-described carbon black having an average primary particle diameter of at least 40 mμ but less than 80 mμ in an amount of from 0.1 to 6.0 parts by weight per 100 parts by weight of the ferromagnetic particles in the upper magnetic layer.

(3) The above-described magnetic recording medium, wherein the upper magnetic layer contains an abrasive agent in an amount of from 0.1 to 12 parts by weight, more preferably 0.5 to 10 parts by weight per 100 parts by weight of the ferromagnetic particles in the upper magnetic layer.

(4) The above-described magnetic recording medium, wherein the lower magnetic layer has a thickness of 3.0 μm or higher, and the upper magnetic layer has a thickness of 1.5 μm or lower.

(5) The above-described magnetic recording medium, wherein the specific surface area measured by the BET method of the ferromagnetic particles contained in the lower magnetic layer is 50 m$^2$/g or lower, more preferably 40 m$^2$/g or lower, and the specific surface area measured by the BET method of the ferromagnetic particles contained in the upper magnetic layer is 30 m$^2$/g or higher.

(6) The above-described magnetic recording medium, wherein the ferromagnetic particles contained in the upper magnetic layer have a coercive force of 1000 Oe or lower, the ferromagnetic particles contained in the lower magnetic layer have a coercive force of 600 Oe or higher, and the ferromagnetic particles contained in the lower and the upper magnetic layers are cobalt-modified $\gamma$-Fe$_2$O$_3$.

Since the lower magnetic layer of the magnetic recording medium of this invention, contains predetermined fine carbon black as described above, the medium has excellent antistatic properties, and due to excellent coloration, high light-intercepting capabilities can be also obtained.

On the other hand, the upper magnetic layer of this invention contains comparatively coarse carbon black the comparatively coarse carbon black is present in the upper layer in a smaller amount (compared to the fine carbon black of the lower layer). Hence, the ferromagnetic particles in the upper layer can be packed more densely, and thus good surface smoothness can be achieved for the upper magnetic layer and therefore excellent electromagnetic characteristics can be obtained.

That is, high antistatic properties and high light-intercepting capabilities can be obtained by the contribution of the lower magnetic layer, and good electromagnetic characteristics and good running durability can be obtained by the contribution of the upper magnetic layer. As a whole, a magnetic recording medium according to the present invention can maintain high levels of all four of the above-described properties.

DETAILED DESCRIPTION OF THE INVENTION

A magnetic recording medium of this invention is basically comprised of a non-magnetic support having provided thereon a lower magnetic layer and an upper magnetic layer in this order. Both the lower and upper magnetic layers contain ferromagnetic particles.

The lower magnetic layer of this invention contains fine particles of carbon black having an average primary particle diameter of less than 20 mμ and preferably not less than 10 mμ in an amount of from 1.0 to 20 parts by weight per 100 parts of the ferromagnetic particles contained in the lower magnetic layer, and the upper magnetic layer of this invention contains comparatively coarse particles of carbon black having an average primary particle diameter of at least 40 mμ, preferably 50 mμ or higher, but less than 80 mμ in an amount of from 0.1 to 10.0 parts by weight per 100 parts by weight of the ferromagnetic particles contained in the upper magnetic layer.

That is, the lower magnetic layer of the magnetic recording medium of this invention contains fine particles of carbon black having a diameter of less than 20 mμ, a size particularly effective for providing excellent electroconductive properties, and thus excellent antistatic properties can be obtained. Further, due to its excellent coloration, high light-intercepting capabilities can be obtained.

The upper magnetic layer does not contain electroconductive fine particles of carbon black, but the upper layer does contain comparatively coarse particles of carbon black having an average primary diameter of at least 40 mμ but less than 80 mμ in an amount less than that used in the lower magnetic layer. As a result, the ferromagnetic particles can be more densely packed, and the surface smoothness can therefore be excellent, thus, excellent electromagnetic characteristics can be obtained.

The lower magnetic layer of the present invention has an extremely excellent electroconductive property. The upper magnetic layer is generally thinner than the lower layer, and as a whole, the magnetic recording medium of the present invention has an excellent charging property. Accordingly, in order to obtain excellent electroconductivity, the upper magnetic layer should preferably be thinner.

When the thickness of the upper magnetic layer is more than 2 μm sufficient electroconductivity can not be obtained. Preferably, the thickness of the upper layer is from 1.5 to 0.1 μm. When the lower magnetic layer is thinner than 2.5 μm, it contributes less to the improvement of electroconductivity. Therefore, the thickness of the lower magnetic layer is preferably 2.5 μm or higher, more preferably from 3.0 to 6.0 μm.

Running durability is largely influenced by the composition of the upper magnetic layer because the upper magnetic layer comes in direct contact with such components as the tape head. It is generally known that the friction coefficient of a magnetic recording medium decreases and its running durability is improved by the use of coarse particles of carbon black. (See JP-B-53-20203 and JP-B-57-12208). However, when the coarse carbon black in a magnetic layer has an excessively large average diameter, the packing density of the ferromagnetic particles contained in the magnetic layer decreases dramatically, and sufficient electromagnetic characteristics cannot be obtained. Excellent running durability can be obtained without deterioration of electromagnetic characteristics by using carbon black in accordance with the present invention where the average particle diameter of the carbon black in the upper layer is from 40 to less than 80 m$\mu$.

Regarding the amount of carbon black in each magnetic layer of this invention, the lower magnetic layer contains fine particles of carbon black having an average primary particle diameter of less than 20 m$\mu$ in an amount of from 1.0 to 20 parts by weight, preferably from 3 to 15 parts by weight per 100 parts by weight of the ferromagnetic particles contained in the lower magnetic layer. The above-described electroconductivity and light-intercepting capabilities are insufficient if the amount of the fine carbon black is less than 1.0 part by weight. Furthermore, the ferromagnetic particles undesirably become less densely packed if the content of the fine carbon black is more than 15 parts by weight or higher.

The upper magnetic layer contains comparatively coarse carbon black particles having an average primary particle diameter of at least 40 m$\mu$ but less than 80 m$\mu$ in an amount of from 0.1 to 10.0 parts by weight, prefereably from 0.1 to 6.0 parts by weight per 100 parts by weight of the ferromagnetic particles contained in the upper magnetic layer. Running durability decreases if the amount of the coarse carbon black of the upper layer is less than 0.1 part by weight, and the ferromagnetic particles became less densely packed if the amount of the coarse carbon black is more than 10 parts by weight. When the packing density of the ferromagnetic particles decreases, the electromagnetic characteristics deteriorate.

The types of carbon black used in the above described upper and lower magnetic layers are not particularly limited, provided that the carbon black has the above-described predetermined average primary particle diameters.

Carbon black having an average primary particle diameter of less than 20 m$\mu$ is commercially available under the trade names of "CONDUCTEX SC" (average primary particle diameter: 18 m$\mu$) produced by Columbian Carbon Co., Ltd., "BLACK PEARLS 800" (18 m$\mu$), AND "BLACK PEARLS 1300" (12 m$\mu$) produced by Cabott Co., Ltd.

Carbon black having an average primary particle diameter of from 40 to less than 80 m$\mu$ is commercially available under the trade names of "#60" (50 m$\mu$) produced by Asahi Carbon Co., Ltd., "RAVEN 450" (62 m$\mu$), and "RAVEN 410" (70 m$\mu$) produced by Columbia Carbon Co., Ltd.

The above-described specific trade names are non-limiting example, and any carbon which meets the requirements as to the above-described average particle diameters can be used. The various kinds of carbon black can be used alone or in combination. In both the upper and the lower magnetic layers of the present invention, the weight ratio of magnetic particles to binder is preferably from 2.5 to 10.0, more preferably from 3 to 8, and it is preferred that the difference between (i) the ratio magnetic particle/binder in the lower magnetic layer and (ii)the magnetic particle/binder in the upper magnetic be 5 or lower and more preferably 4 or lower.

The magnetic recording medium of this invention can be prepared, for example, in the following manner.

The non-magnetic supports which can be used in this invention include films or sheets comprised of polyesters such as polyethylene terephthalate (PET) or polyethylene naphthalate, polyolefins such as polypropylene, cellulose derivatives such as cellulose triacetate or cellulose diacetate, vinyl type resins such as polyvinyl chloride or polyvinylidene chloride, synthetic resins such as polycarbonate, polyamide, polyamide imide or polyimide foils of non-magnetic metals such as aluminum or copper; metal foils such as a stainless foil and paper and ceramic sheets. The non-magnetic support generally has a thickness of from 2.5 to 100 $\mu$m, preferably from 3 to 80 $\mu$m.

The upper and lower magnetic layer of the magnetic recording medium of the present invention basically comprise ferromagnetic particles dispersed in a binder. The magnetic particles which can be used in this invention are not particularly limited. Examples thereof include conventional ferromagnetic particles such as $\gamma$-$Fe_2O_3$, $FeO_x$ (1.33 < x < 1.5), Co-containing $\gamma$-$Fe_2O_3$, Co-containing $FeO_x$ (1.33 < x < 1.5), $Fe_3O_4$, Co-containing $Fe_3O_4$, $CrO_2$, Co-Ni-P alloy or Fe-Co-Ni alloy.

The magnetic recording medium of this invention is comprised of a lower and upper magnetic layers having different characteristics respectively. That is, in order to provide a lower magnetic layer having excellent reproduced output mainly at a long wave length region, the lower magnetic layer is prepared so that the residual magnetization is as high as possible. For the above purpose, the average particle diameter of the ferromagnetic particles in the lower magnetic layer is adjusted so that specific surface area by the BET method is preferably 50 $m^2/g$ or lower, more preferably 40 $m^2/g$ or lower. It is necessary for the upper magnetic layer to have excellent electromagnetic characteristics, particularly a large reproduced output at short wave length recording and high S/N. To achieve these characteristics, it is preferred to use in the upper magnetic layer ferromagnetic particles having a low average particle diameter, and thus, the specific surface area by the BET method for the ferromagnetic particles in the upper magnetic layer is preferably 30 $m^2/g$ or higher. Among these ferromagnetic particles, cobalt modified $\gamma$-$Fe_2O_3$ is particularly preferred. It is also preferred that the ferromagnetic particles present in the upper magnetic layer have a coercive force of 1000 Oe or lower and those present in the lower magnetic layer have a coercive force of 600 Oe or higher. Extremely excellent electromagnetic characteristics can be obtained with the above combination, and furthermore, this combination permits the carbon black of this invention to be more effective.

For preparing a magnetic coating composition for use in this invention, a binder in the form of a resin is mixed with a solvent. Optionally, abrasive agents and lubricating agents can be added to the magnetic coating composition.

Examples of resin used as the binder include conventional thermoplastic resins, thermosetting resins, reactive type resins and mixtures thereof. More specifically, examples of the resin include vinyl chloride copolymers (e.g., vinyl chloride/vinyl acetate copolymer, vinyl chloride/vinyl acetate/vinyl alcohol copolymer, vinyl chloride/vinyl acetate/acrylic acid copolymer, vinyl chloride/vinylidene chloride copolymer, vinyl chloride/acrylonitrile copolymer, ethylene/vinyl acetate copolymer, and vinyl chloride copolymer having a polar group such as —$SO_3Na$ or —$SO_2Na$ and an epoxy group), cellulose derivatives (such as nitrocellulose resins), acrylic resins, polyvinyl acetal resins, polyvinyl butyral resins, epoxy resins, phenoxy resins), and polyurethane resins (e.g., polyester polyurethane resins, polyurethane resins having a polar group such as —$SO_3Na$ or —$SO_2Na$, and polycarbonate polyurethane resins).

When a hardening agent is used in the binder, polyisocyanate compounds are generally used. Such polyisocyanate compounds are generally selected from those that are used as a hardening agent for polyurethane resins.

When a hardening treatment is preformed using electron beam radiation, compounds having a reactive double bond (e.g., urethane acrylate) can be used in the binder.

Further, it is preferred that abrasive agents are used in the upper magnetic layer of this invention to improve running durability.

The abrasive agents which can be used in this invention are preferably those having a Mohs' hardness of 5 or higher. Examples thereof include MgO (Mohs' hardness of 6), $Cr_2O_3$ (Mohs' hardness of 8.5), $\alpha$-$Al_2O_3$ (Mohs' hardness of 9), $\gamma$-$Al_2O_3$ (Mohs' hardness of 7 to 8), SiC ($\alpha$ or $\beta$, Mohs' hardness of 9.5), $\alpha$-$Fe_2O_3$ (Moh's hardness of 6), BN (Moh's hardness of 9), silicon nitride, iron nitride, corundum (Moh's hardness of 9), artificial corundum, diamond (Moh's hardness of 10) and garnet (Moh's hardness of 7). $\alpha$-$Al_2O_3$ is particularly preferred.

The average particle diameter of the abrasive agents in the upper magnetic layer is generally from 0.05 to 1.0 $\mu$m, preferably from 0.10 to 0.50 $\mu$m. The abrasive agents preferably are present in the upper magnetic layer in an amount of from 0.1 to 12 parts by weight, more preferably from 0.5 to 10 parts by weight of parts by weight per 100 parts by weight of the ferromagnetic particles in the upper magnetic layer. Running durability is insufficient when the amount of abrasives in the upper magnetic layer is not more than 0.1 part by weight, and the electromagnetic characteristics are deteriorated and tape head wear out undesirably increases when the amount exceeds 12 parts by weight. If desired, abrasive agents having various particle diameter and/or made of different materials may be used in combination.

The above-described abrasive agents are preferably used in the upper magnetic layer, and it is preferred not to use these agents in the lower magnetic layer in order to prevent the magnetic flux density from decreasing and surface smoothness from deteriorating.

Examples of solvents used for preparing a magnetic coating composition include ketones (such as acetone, methyl ethyl ketone, methyl isobutyl ketone, ethyl isobutyl ketone, or cyclohexanone), esters (such as methyl acetate, ethyl acetate, butyl acetate, or monoethylether of glycol acetate), glycol ethers (such as ether, glycol dimethyl ether or dioxane), aromatic hydrocarbons (such as benzene, toluene or xylene), and chlorinated hydrocarbons (such as methylene chloride, ethylene chloride, carbon tetrachloride, chloroform, ethylene chlorohydrin or dichlorobenzene). Those solvents may be used alone or in combination. Polar solvents such as ketones or solvents having a polar solvent are particularly preferred.

During the preparation of a magnetic coating composition, the ferromagnetic particles are homogeneously mixed, kneaded and dispersed with the binder. A two roll mill, a three roll mill, an open kneader, a kneader under pressure and a continuous kneader are used for predispersing, and then, a sand grinder and a ball mill are used for post-dispersing.

Various additives such as lubricating agents or dispersing agents can be optionally selected, depending upon the purpose.

The magnetic coating composition thus prepared from the above-described materials is then coated on a non-magnetic support in the following manner. At first, components for forming the lower magnetic layer (such as fine carbon black particles, resins and ferromagnetic particles, and hardening agents; if desired) are mixed, kneaded and dispersed with a solvent to prepare a coating composition for the lower magnetic layer. Secondly, a coating composition for the upper magnetic layer is prepared in the same manner as above.

Then, the coating composition for the lower magnetic layer is coated in a dry thickness of 2.5 $\mu$m or higher, preferably from 3.0 to 6.0 $\mu$m, on a running non-magnetic magnetic support, and while the coated layer is wet, the coating composition for the upper magnetic layer is successively coated thereon so that the dry thickness of the upper magnetic layer is 2.0 $\mu$m or lower, preferably 1.5 $\mu$m or lower, more preferably from 0.1 to 1.0 $\mu$m.

An example of a method for successively coating two layers is as follows. When an extruding coating device is used as a coating device, two extruding coating devices may be installed for coating under the condition that a running non-magnetic support is sandwiched by the two extruding coating devices, or two devices may be installed at such a certain distance interval that the upper layer is coated while the lower magnetic layer is wet. "Wet" means the state when the coated layer still contains solvents and exhibits adhesiveness.

The coating devices for coating the above-described magnetic coating compositions include an air doctor coating device, a blade coating device, a rod coating device, an extruding coating device, an air knife coating device, a squeeze coating device, an impregnating coating device, a reverse roll coating device, a transfer roll coating device, a gravure coating device, a kiss coating device, a cast coating device, a spray coating device and a spin coating device. In this invention, an extruding device for simultaneously multicoating having two slots (as disclosed in Japanese Patent Application No. 124631) is particularly preferred.

The upper magnetic layer obtained by the above method is extremely thin (having a thickness of 1.5 $\mu$m or lower), is uniformly thin, and has an extremely smooth surface. Thus, this layer can be used to prepare a magnetic recording medium having excellent running durability without suffering a deteriorating in electromagnetic characteristics.

The above-described magnetic coating compositions are coated in such a manner that the total thickness of the magnetic layers (i.e.) the thicknesses of the lower magnetic layer plus that of the upper magnetic layer) is from about 2.5 to 10 $\mu$m.

A backing layer may be coated on the surface of the non-magnetic support which is opposite to the surface coated with the magnetic layer. Such a backing layer is generally formed by coating a coating composition which contains granular components, such as abrasive agents or antistatic agents and binders dispersed in an organic solvent.

Adhesive layers may be provided on the surface of the non-magnetic support which is coated with a magnetic coating composition and on the surface of the support which is coated with a coating composition for forming backing layer.

Generally, a layer coated with a magnetic coating composition (regardless whether the layer is an upper layer or a lower layer) is subjected to magnetic orientation to orientate the ferromagnetic particles contained in that magnetic layer, and then the layer is dried.

The thus-dried magnetic layer is then provided with surface smoothing treatment. Surface smoothing treatment is performed, for example, using a super calender roll. Voids formed by the removal of solvents during drying disappear by surface smoothing treatment, and the ferromagnetic particles in the magnetic layer become more densely packed. As a result, a magnetic recording medium having excellent electromagnetic characteristics can be obtained.

The thus-hardened laminate is cut to a desired shape. Cutting is generally performed under normal condition using a general cutting device such as a slitter.

The magnetic recording medium of this invention has been described referring to a two layer system, i.e. a system comprising an upper and a lower layer. However, the magnetic recording medium of the present invention may have three layers or more, provided that at two least magnetic layers have the above-described properties.

This invention will be illustrated more specifically by the following Examples and Comparative Examples. However, this invention is not to be construed as being limited to the Examples. In each Example, all parts are by weight, unless otherwise mentioned.

EXAMPLE 1

| Coating composition for the lower magnetic layer | |
| --- | --- |
| Co-γ-Fe$_2$O$_3$ (Hc: 650 Oe, S BET specific surface area: 35 m$^2$/g) | 100 parts |
| Vinyl chloride/vinyl acetate/ maleic anhydride copolymer (Composition ratio: 86:13:1, Degree of polymerization 400) | 12 parts |
| Polyester polyurethane resin | 6 parts |
| Carbon black A (Average primary particle diameter: 18 μm) | 10 parts |
| Butyl stearate | 1 part |
| Stearic acid | 2 parts |
| Butyl acetate | 200 parts |

| Coating composition for the upper magnetic layer | |
| --- | --- |
| Co-γ-Fe$_2$O$_3$ (Hc: 700 Oe, S BET specific surface area: 40 m2/g) | 100 parts |
| Vinyl chloride/vinyl acetate/ maleic anhydride copolymer (Composition ratio: 86:13:1, Degree of polymerization 400) | 12 parts |
| Polyester polyurethane resin | 6 parts |
| Carbon black B (Average primary particle diameter: 40 μm) | 1 part |
| α-Al$_2$O$_3$ (Average particle diameter: 0.6 μm) | 6 parts |
| Butyl stearate | 1 part |
| Stearic acid | 2 parts |
| Butyl acetate | 200 parts |

Separately, each of the above-described two compositions were mixed, kneaded and dispersed using a sand mill respectively. Six parts of polyisocyanate and 40 parts of butyl acetate were added to the thus-obtained dispersions and filtrated using a filter having an average pore diameter of 1 μm to prepare a coating composition for forming a lower magnetic layer and a coating composition for an upper magnetic layer respectively.

The coating compositions for the lower and the upper magnetic layers were coated using a simultaneously multicoating extruding coating device having a slot for coating the lower magnetic layer and a slot for coating the upper magnetic layer in the following manner.

Using an extruding coating device having a slot for coating the lower magnetic layer, the thus-prepared coating composition for the magnetic layer was coated in a dry thickness of 3.5 μm on polyethylene terephthalate support having a thickness of 14 μm which support was running at a speed of 60 m/min. Immediately thereafter, while the lower magnetic layer was wet, the coating composition for the upper magnetic layer was coated thereon in a dry thickness of 0.5 μm using an extruding coating device having a slot for coating a upper magnetic layer. While the composite magnetic layer was wet, it was provided with magnetic orientation using a magnet, dried, provided with supercalendering treatment and slit to a ½ inch width to prepare a video tape.

EXAMPLE 2

A video tape was prepared in the same manner as Example 1 above, except that carbon black B having an average primary particle diameter of 80 mμ was used instead of 40 mμ in the coating composition for the upper magnetic layer.

EXAMPLE 3

A video tape was prepared in the same manner as in Example 1, except that carbon black A having an average primary particle diameter of 10 mμ instead of 18 mμ was used in the coating composition for the lower magnetic layer.

EXAMPLE 4

A video tape was prepared in the same manner as in Example 3, except that carbon black B having an average primary particle diameter of 75 mμ instead of 40 mμ was used in the coating composition for the upper magnetic layer.

EXAMPLE 5

A video tape was prepared in the same manner as in Example 4, except that 15 parts of carbon black A having an average primary particle diameter of 18 mμ was used instead of 10 parts of carbon black A having an average primary particle diameter of 10 mμ in the coating composition for the lower magnetic layer.

EXAMPLE 6

A video tape was prepared in the same manner as in Example 5, except that 10 parts of carbon black A was used instead of 15 parts thereof in the coating composition for the lower magnetic layer, and 0.1 part of carbon black B was used instead of 1 part thereof in the coating composition for the lower magnetic layer.

EXAMPLE 7

A video tape was prepared in the same manner as in Example 6, except that 5 parts of carbon black B was used instead of 0.1 part thereof in the coating composition for the upper magnetic layer.

EXAMPLE 8

A video tape was prepared in the same manner as in Example 1, except that 8 parts of carbon black A having an average primary particle diameter of 15 mμ was used instead of 10 parts of carbon black A having an average primary particle diameter of 18 mμ in the coating composition for the lower magnetic layer, and 2 parts of carbon black B having an average primary particle diameter of 60 mμ was used instead of 1 part of carbon black B having an average primary particle diameter of 40 mμ in the coating composition for the upper magnetic layer.

COMPARATIVE EXAMPLE 1

A video tape was prepared in the same manner as in Example 1, except that carbon black B having an average particle diameter of 130 mμ was used instead of 40 mμ in the coating composition for the upper magnetic layer.

COMPARATIVE EXAMPLE 2

A video tape was prepared in the same manner as in Example 1, except that carbon black B having an average primary particle diameter of 30 mμ instead of 40 mμ was used in the coating composition for the upper magnetic layer.

COMPARATIVE EXAMPLE 3

A video tape was prepared in the same manner as in Example 1, except that carbon black A having an average primary particle diameter of 30 mμ instead of 18 mμ was used in the coating composition for the lower magnetic layer and carbon black B having an average primary particle diameter of 75 mμ instead of 40 mμ was used in the coating composition for the upper magnetic layer.

COMPARATIVE EXAMPLE 4

A video tape was prepared in the same manner as in Example 4, except that carbon black A was not used in the coating composition for the lower magnetic layer.

COMPARATIVE EXAMPLE 5

A video tape was prepared in the same manner as in Example 5, except that 10 parts of carbon black A was used instead of 15 parts thereof in the coating composition for the lower magnetic layer, the thickness of the lower magnetic layer was 2.0 μm instead of 3.5 μm, and the thickness of the upper magnetic layer was 2.5 μm instead of 0.5 μm.

REFERENCE EXAMPLE 1

A video tape was prepared in the same manner as in Example 1, except that the coating composition for the upper magnetic layer was not used, and only a coating composition for the lower magnetic layer was directly coated on a polyethylene terephthalate support in a dry thickness of 3.5 μm.

Table 1 shows the structures of the magnetic layers of the video tapes obtained in Examples 1 to 8, Comparative Examples 1 to 5 and in Reference Example 1. Table 1 also shows the physical properties of each of these tapes measured in the following manner.

MEASUREMENT (1) Surface electric resistance

The surface electric resistances of each tape was measured using a digital surface electric resistance meter "TR-8611A" produced by Takeda Riken Co., Ltd. at 23° C. and 30% RH and using tape samples having a size of ½ inch × ½ inch.

(2) Video S/N

S/N of each tape was measured using a noise meter "925C" produced by Shibasoku Co., Ltd. The S/N values shown in Table 1 are relative values compared against the standard tape "Super AG T-120" produced by Fuji Photo Film Co., Ltd. which was assumed to have 0 dB as its S/N value. The noise level was measured using a high pass filter (10 kHz) and a low pass filter (4 MHz). The VTR "NV-8300" produced by Matsushita Electric Industrial Co., Ltd. was used to run the tape.

(3) Dynamic friction coefficient (μ value)

For each tape values were calculated by the following equation:

$$\mu = 1/\pi \cdot lnt/50$$

For the calculation (T) is measured as follows. When the tape was contacted with a stainless steel pole at a tension of 50 g, and a tension (T) necessary for the tape to run at a rate of 3.3 cm/sec. was measured.

TABLE 1

| | Lower magnetic layer Carbon A (mμ/part) | Upper magnetic layer Carbon B (mμ/part) | Electric resistance (Ω/SQ) | μ value | Video S/N (dB) |
|---|---|---|---|---|---|
| Examples | | | | | |
| 1 | 18/10 | 40/1 | $6 \times 10^7$ | 0.23 | +2.2 |
| 2 | 18/10 | 80/1 | $7 \times 10^7$ | 0.24 | +2.1 |
| 3 | 10/10 | 40/1 | $2 \times 10^7$ | 0.26 | +2.4 |
| 4 | 10/10 | 75/1 | $2.5 \times 10^7$ | 0.24 | +2.2 |
| 5 | 18/15 | 75/1 | $1 \times 10^7$ | 0.26 | +2.1 |
| 6 | 18/10 | 75/0.1 | $7 \times 10^7$ | 0.28 | −2.9 |
| 7 | 18/10 | 75/5 | $6 \times 10^7$ | 0.21 | +2.0 |
| 8 | 15/8 | 60/2 | $8 \times 10^7$ | 0.25 | +2.2 |
| Comparative Examples | | | | | |
| 1 | 18/10 | 130/1 | $7.5 \times 10^7$ | 0.24 | +0.8 |
| 2 | 18/10 | 30/1 | $1 \times 10^7$ | 0.35 | −2.5 |
| 3 | 30/10 | 75/1 | $9 \times 10^7$ | 0.23 | +1.1 |
| 4 | — | 75/1 | $3 \times 10^7$ | 0.23 | +3.0 |
| 5 | 18/10 | 75/1 | $2 \times 10^9$ | 0.25 | +2.3 |
| Reference Example | 18/10 | — | $9 \times 10^7$ | 0.45 | +2.7 |

TABLE 1-continued

| Lower magnetic layer Carbon A (mμ/part) | Upper magnetic layer Carbon B (mμ/part) | Electric resistance (Ω/SQ) | μ value | Video S/N (dB) |
|---|---|---|---|---|
| 1 | | | | |

It is clear from Table 1 that the magnetic recording medium using the predetermined carbon black of this invention is excellent in charging property of the magnetic layer as shown by its low surface electrical resistance, excellent in running durability as shown by its low μ value and also excellent in electromagnetic characteristic as shown by its high S/N.

The results for Comparative Examples 1 to 3, which used carbon black having average particle diameters outside the ranges of this invention, were as follows. Electromagnetic characteristics were poor in Comparative Example 1 because the upper magnetic layer used carbon black having a large particle diameter. Running durability was deteriorated in Comparative Example 2 because the particle diameter of carbon used in the upper magnetic layer was too small. The charging property and electromagnetic characteristics were insufficient in Comparative Example 3 where the lower magnetic layer used carbon black having a large particle diameter.

When the thickness of the lower magnetic layer was too thin and that of the upper magnetic layer was too thick, as in Comparative Example 5, the charging property was poor.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having provided thereon a lower magnetic layer having a thickness of 2.5 μm or higher and an upper magnetic layer having a thickness of 2 μm or lower in this order, wherein both the upper and lower magnetic layers contain ferromagnetic particles, and the lower magnetic layer contains carbon black having an average primary particle diameter of less than 20 mμ in an amount of from 1.0 to 20 parts by weight per 100 parts by weight of the ferromagnetic particles present in the lower magnetic layer, and the upper magnetic layer contains carbon black having an average primary particle diameter of at least 40 mμ but less than 80 mμ in an amount of from 0.1 to 10.0 parts by weight per 100 parts by weight of the ferromagnetic particles present in the upper magnetic, but less than the amount of carbon black used in the lower magnetic layer.

2. A magnetic recording medium as in claim 1, wherein the lower magnetic layer contains carbon black having an average primary particle diameter of less than 20 mμ in an amount of from 3 to 15 parts by weight per 100 parts by weight of the ferromagnetic particles present in the lower magnetic layer.

3. A magnetic recording medium as in claim 1, wherein the upper magnetic layer contains an abrasive agent in an amount of from 0.1 to 12 parts by weight per 100 parts by weight of the ferromagnetic particles present in the upper magnetic layer.

4. A magnetic recording medium as in claim 1, wherein the lower magnetic layer has a thickness of 3.0 μm or higher and the upper magnetic layer has a thickness of 1.5 μm or lower.

5. A magnetic recording medium as in claim 4, wherein the lower magnetic layer has a thickness of from 3.0 μm to 6.0 μm.

6. A magnetic recording medium as in claim 1, wherein the specific surface area measured by the BET method of the ferromagnetic particles present in the lower magnetic layer is 40 m$^2$/g or lower, and the specific surface as measured by the BET method of the ferromagnetic particles present in the upper magnetic layer is 30 m$^2$/g or higher.

7. A magnetic recording medium as in claim 1, wherein the ferromagnetic particles present in the upper magnetic layer have a coercive force of 1,000 Oe or lower, the ferromagnetic particles present in the lower magnetic layer have a coercive force of 600 Oe or higher, and the ferromagnetic particles present in the lower and the upper magnetic layers are cobalt modified γ-Fe$_2$O$_3$.

8. A magnetic recording medium as in claim 1, wherein the weight ratio of magnetic particles/binder in the upper magnetic layer and in the lower magnetic layer is from 2.5 to 10.0.

9. A magnetic recording medium as in claim 1, wherein the ferromagnetic particles in the lower magnetic layer have a specific surface area by BET method of 50 m$^2$/g or lower.

10. A magnetic recording medium as in claim 3, wherein the abrasive agents in the upper magnetic layer have an average particle diameter of from 0.05 to 1.0 μm.

11. A magnetic recording medium as in claim 10, wherein the abrasive agents in the upper magnetic layer have an average particle diameter of from 0.10 to 0.50 μm.

12. A magnetic recording medium as in claim 1, wherein the lower magnetic layer contains no abrasive agents.

* * * * *